United States Patent Office 3,300,188
Patented Jan. 24, 1967

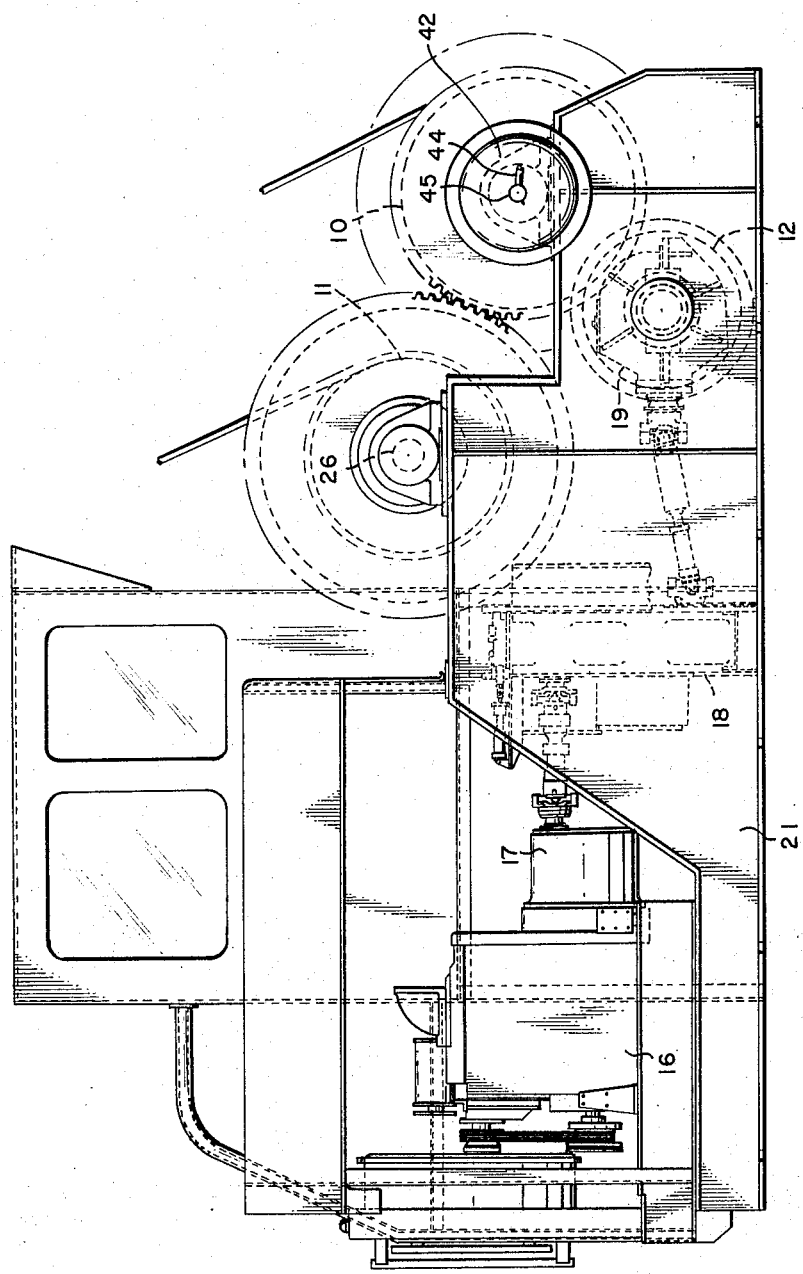

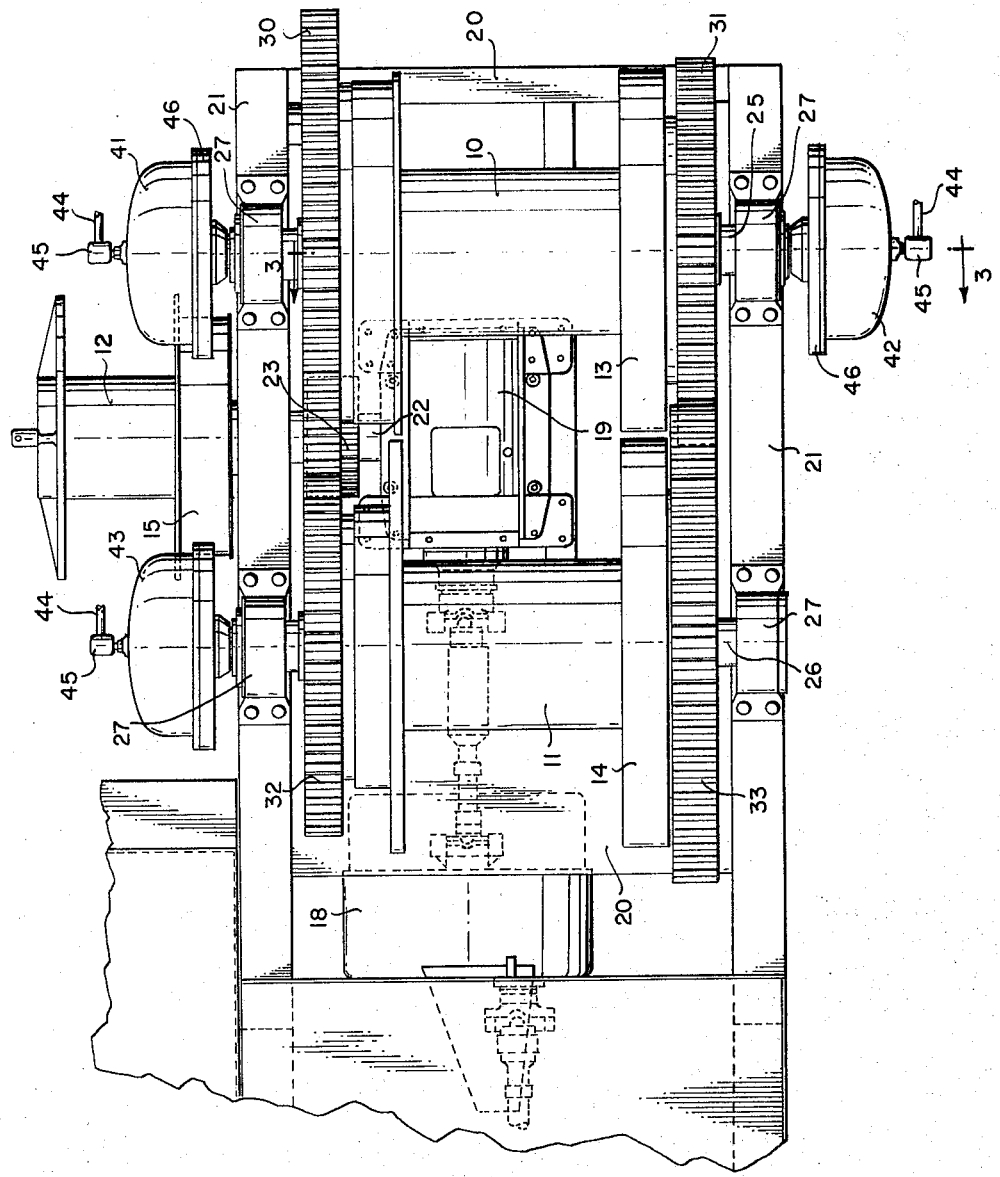

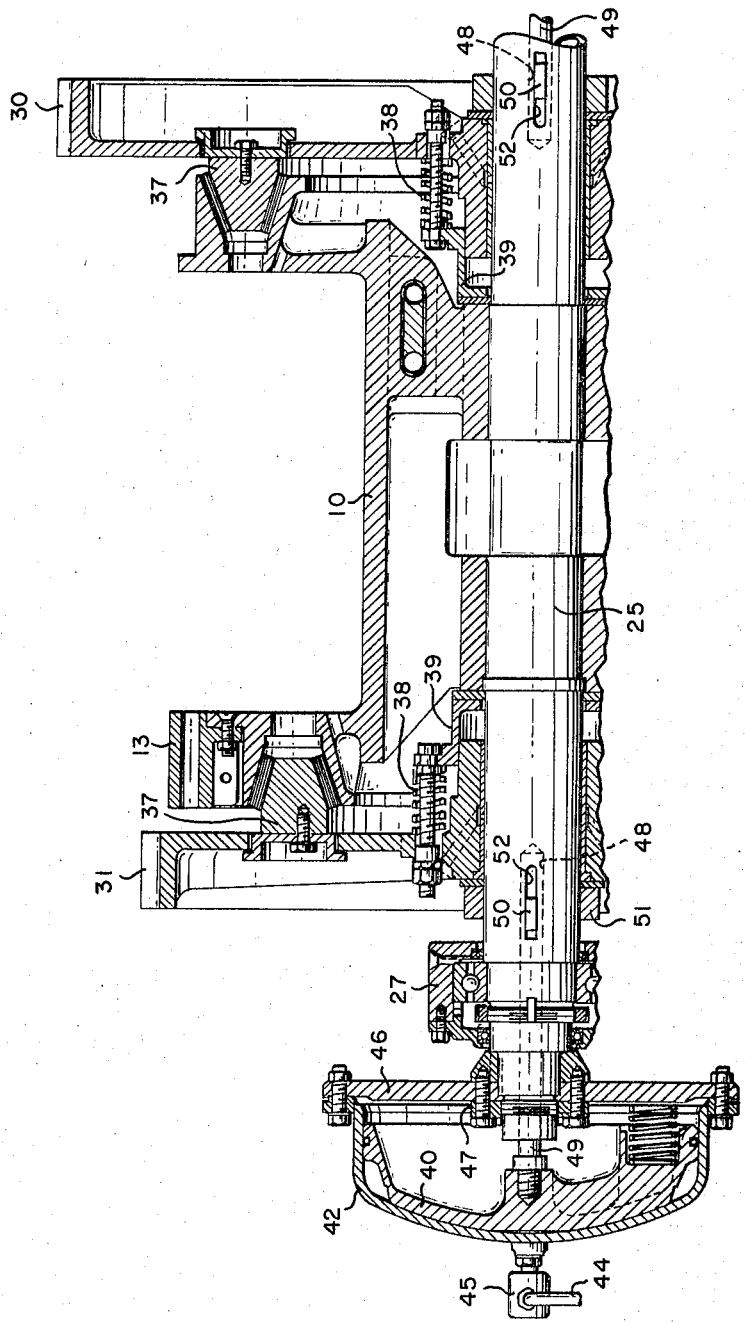

3,300,188
INTERLOCKING YARDER
James R. Thompson, Seattle, Wash., assignor to Washington Iron Works, Seattle, Wash., a corporation of Washington
Filed Sept. 22, 1964, Ser. No. 398,191
12 Claims. (Cl. 254—184)

This invention relates to a yarder, and namely a machine for use in logging operations for hauling logs to a landing. Yarders commonly provide a number of powered spooling drums. The function of two of these drums is to spool the main and the haul-back ends of a log-hauling cable, such cable being strung between the yarder and a tail block located at the extreme outer limit of the area being logged. A choker string is attached to the log-hauling or "main" line of the cable, and as the main spooling drum is powered for the inhaul run of such main line the condition of the main drum perforce changes from a bare wrap to a full wrap. At the same time the haul-back drum, paying out the haul-back line, changes from a full to a bare wrap. The converse occurs when the haul-back drum is powered to take in the haul-back line in obtaining an outhaul run of the main line of the cable.

In said inhaul run of the main line it is desirable that little or no slack be permitted in the haul-back line. It is especially important that the haul-back line be kept tight in downhill yarding. When both the main and haul-back lines are kept tight they tend to pick the leading end of the log off the ground. With the leading end of the log in the air, it clears obstructions on the ground, such as logs and stumps. It also prevents the log from running downhill and becoming unhooked from the choker.

During an inhaul run of the haul-back, an elimination of slack from the then trailing main line is of importance. Butt rigging and chokers are elevated above the ground and kept free of entanglement with logs and stumps if both the main and the haul-back are taut at all times.

The procedure heretofore has been to brake the haul-back drum during the inhaul travel of the main line and to brake the main drum during the inhaul travel of the haul-back line. A "heavy" brake increases wear and places an unnecessary load on the yarding engine. Considering that the stress load to which the trailing line is subjected does not remain constant an operator is more or less required to use a "heavy" brake if the trailing line is to be kept free of slack.

The present invention, for its general object, aims to provide a yarder so engineered that during periods when one drum, either the haul-back or the main, is full and the other bare both drums can be powered from the yarding engine at the rotational speeds necessary to insure that the pay-out and the wind-in, as the case may be, is identical as between both ends of the cable.

This with other more particular objects and advantages in view will appear and be understood in the course of the following description and claims, the invention consisting in the novel construction and in the adaptation and combination of parts hereinafter described and claimed.

In the accompanying drawings:
FIGURE 1 is a side elevational view illustrating a yarder constructed to embody preferred teachings of the present invention.
FIG. 2 is a fragmentary enlarged-scale top plan view thereof; and
FIG. 3 is a transverse vertical sectional view drawn to an enlarged scale on line 3—3 of FIG. 2.

Referring to said drawings, the yarder provides the usual plurality of spooling drums and namely a main drum 10, a haul-back drum 11, and a straw drum 12. Provided for each of these drums is a manually operated brake, as 13, 14 and 15, respectively. 16 denotes a power plant for the drums connected through a torque converter 17 with the input end of a transmission 18, and 19 denotes a transfer case driven from the output end of the transmission. A suitable foundation to support the yarder is here shown as comprising cross ties 20 extending between a pair of paralleling side beams 21, the side beams being multi-level and I-section. The engine 16 with its torque converter 17, the transmission 18, and the gear case 19 are located in a more or less in-line relationship on the approximate longitudinal median line of the foundation.

Important to the present invention is that the transmission employed (Clark, #8421) affords very nearly identical speeds in both directions. Each direction affords a selection of four speed ratios. Behind the transmission and operating at an approximate 4 to 1 ratio, the transfer case employs spiral bevel gears and places the rotary axis of its output shaft 22 horizontal and transverse to the foundation. A pinion 23 (24-tooth by preference) is keyed or otherwise fixed to the shaft 22 to occupy a position adjacent and to the inside of one of the two side beams 21. The outer end of the shaft extends through and is exposed beyond the side beam, and has the straw drum 12, with its associated brake 15, mounted on said exposed end.

The main drum 10 and the haul-back drum 11 lie between the side beams, being carried by respective shafts 25 and 26 for rotation about stepped transverse horizontal axes one spaced to the rear and the other to the front of a perpendicular raised from the rotary axis of the shaft 22. Thrust and journal bearings for the shafts 25 and 26 are provided by pillow blocks 27 which surmount the side beams.

Gear wheels 30 and 31 occupy positions one at one end and the other at the other end of the main drum 10, each being journaled for both rotary and endwise slide motion upon the shaft 25. Gear wheel 31 has a smaller diameter than gear wheel 30. 90 teeth and 112 teeth are suitable in the respective instance. Such gear wheel 30 is in constant mesh with the pinion 23 and also with a gear wheel 32 which is journaled for both rotary and endwise slide motion upon the shaft 26. Gear wheel 31 is in constant mesh with a gear wheel 33 which is fixed to the haul-back drum for rotation in unison therewith. Gear wheels 32 and 33 have the same number of teeth as the gear wheels 31 and 30, respectively, namely 90 for the gear wheel 32 and 112 for the gear wheel 33. For a purpose which will hereinafter appear these gear ratios reflect the relative speeds at which cable winds and unwinds from the spooling drums when the drum has a single wrap and a full wrap.

Cone friction clutches provide a releasable couple with the main drum 10 from either of the two gear wheels 30 and 31, and with the haul-back drum 11 from the gear wheel 32. The cavity for these clutches is in each instance provided by the drum and lies concentric to the rotary axis of the shaft 25 or 26, as the case may be, in facing relation to the concerned gear wheel. The cone complement 36 for each cavity is carried by a ring 37 which is bolted or otherwise fixedly secured to the gear wheel. Each clutch is normally held in a disengaged condition by a set of springs 38 exerting outwardly-directed endwise pressure against the related gear wheel. The springs seat against a spring cage 39 which surrounds the shaft 25 or 26, as the case may be, in shouldering engagement against the hub of the related spooling drum.

Endwise motion of the gear wheels in opposition to said springs, so as to engage the clutches, is afforded by a respective pneumatic operator. These operators lie to the outside of the pillow blocks 27, receiving support from projecting ends of the drum shafts, and each has a piston 40 working in a respective cylinder, as 41, 42 and 43. Fluid-flow lines 44 attached by rotorseals 45 with the outer ends of the cylinders connect the cylinders with respective control valves (not shown) for supplying pressure air to and dumping same from the cylinders.

Bell-shaped, the cylinders are bolted or otherwise rigidly secured to a flanged mounting head 46. This head is keyed on the projecting end of the related shaft and is held against endwise displacement by a keeper nut 47. The keeper nut threads upon the shaft and is bolted to the mounting head. The shaft end presents a center-bore 48. The operating connection between the pneumatic operator and the gear wheel, for said engagement of the clutch, is comprised of a spindle 49, a cross-key 50, and a thrust sleeve 51. The spindle has a sliding fit in the center-bore with its outer end attached to the piston and its inner end attached to the cross-key. The cross-key extends through diametrical slots 52 formed in the drum shaft and connects by its ends with the thrust sleeve. The thrust sleeve surrounds the shaft in shouldering engagement against the outer end of the hub of the concerned gear wheel.

From the foregoing description it will have been seen that with the transmisison driving in any of its four speeds, either ahead or astern, the gear wheel 30 is live in that it is meshing the drive pinion 23.

Should it be desired to drive only the main drum 10 the clutch 41 is engaged. This couples such live gear wheel 30 to the main drum. Should it be desired to drive only the haul-back drum 11 the clutch 43 is engaged. This couples the gear wheel 32 to the drum 11. Inasmuch as the gear wheel 32 is in constant mesh with such live gear wheel 30 the latter is now passing its drive to the haul-back drum, albeit in a direction opposite the direction in which it drives the main drum.

Should it be desired to drive both drums, the operator either engages both the clutch 41 and the clutch 43 or both the clutch 41 and the clutch 42. In the former instance the haul-back drum turns at a faster speed that the main drum. In the latter instance the haul-back drum turns at a slower speed than the main drum. The differential (approximately 11 to 9) represents the relative r.p.m.'s found to be necessary in order that a single wrap of cable will wind in or pay out at approximately the same line speed as a full wrap. When the choker lines of an endless log-haul cable reach the end limit of their outhaul travel the haul-back drum of the yarder perforce carries a full wrap while the main drum is empty. The operator, in drawing a log or logs to the yarder, need only first engage the clutch 41 and place the transmission in "ahead" drive, while momentarily braking the haul-back drum so as to take up slack present in the haul-back cable. As soon as slack is out of the line, the brake is released and clutch 42 is engaged. Clutch 41 remains engaged. The main drum and the haul-back drum now turn in said 11/9 ratio with the result that the haul-back cable pays out and the main cable winds in at substantially an identical line speed. This ratio is perforce maintained until the main drum initiates the second level of its wrap. Momentarily in advance thereof the operator releases clutch 42, and then governs the pay-out from the haul-back drum by means of the brake 14 until such time as the main cable commences the outermost level of its wrap, whereupon clutch 43 is engaged. Both drums now are again driven from the engine, albeit with the haul-back drum turning at the faster speed dictated by the 9/11 ratio obtaining between the meshed gear wheels 32 and 30 so as to again pay out the haul-back cable at an engine-controlled line speed matching the wind-in speed of the main cable.

For the outhaul travel of the main cable, the above procedure is reversed, with the transmisison perforce having "astern" settings.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. A yarder for use with a tail block for spooling the two ends of a cable strung through said block, comprising: a respective spooling drum for each of said cable ends having a capacity so related to the length of the cable that when one of said drums holds a given minimal number of wraps and the other drum a given maximal number of wraps the runs of the cable between the yarder and the tail block are free of slack, and normally inactive drive means, adapted to be activated when the wrap conditions of said drums are said minimal and said maximal, operating when activated to power both spooling drums so that one pays out while the other winds in at rotational speeds having a fixed ratio, one drum to the other drum, pre-established such that the line speeds of both runs of the cable are the same, and manually controlled means for activating said drive means, the two drums being located one alongside the other, the drive means comprising a power plant, a drive pinion driven from the power plant, and a pair of meshed gear wheels, one for each of the two drums, disposed at one end of the drums with each gear wheel journaled for rotation about an axis coinciding with the rotary axis of a related one of the drums, the relative number of teeth as between the gear wheel related to the drum having the maximal wrap and that related to the drum having the minimal when said drive means is adapted to be activated being in inverse ratio to the diameters of the drums when they hold said maximal and said minimal number of wraps, the drive pinion being in mesh with one of said gear wheels, the manually controlled activating means comprising respective clutches for coupling each gear wheel to the related drum.

2. The yarder of claim 1 having a reversible multi-speed transmission between the power plant and the drive pinion.

3. A yarder according to claim 1 having a second pair of meshed gear wheels occupying positions at the other end of the drums with one gear wheel of such second pair journaled for rotation about an axis coinciding with the rotary axis of the drum which is related to said gear wheel meshed by the drive pinion and with the other gear wheel of such second pair co-axially fixed to the other drum, the tooth ratio as between the two gear wheels of said second pair of gears being in inverse correspondence to the tooth ratio of the first-named pair of gear wheels, a manually controlled clutch being provided for coupling the journaled gear wheel of said second pair of gears to said drum with which it is related.

4. The yarder of claim 1 having a respective manually controlled brake for each of the drums.

5. The yarder of claim 1 in which the clutches are pneumatically operated.

6. A yarder for use with a tail block for spooling the two ends of a cable strung through said block, comprising: two drums journaled one alongside the other for rotation about paralleling axes and adapted one drum to have one of the cable ends spooled thereon and the other drum to have the other cable end spooled thereon, the drums being so related to the runs of the cable between the yarder and the tail block that when one of said drums holds a given minimal number of wraps and the other drum a given maximal number of wraps; the runs are each free of slack, a large gear wheel at one end and a small gear wheel at the other end of one of said drums each journaled for rotation independently of the drum about an axis coinciding with the rotary axis of the drum, the ratio between the teeth of said large and small gear wheels inversely corresponding to the circumferences of the drums when they hold said given minimal and said given maximal number of wraps, a respective gear wheel at each of the two ends of the other of the two drums with one such gear wheel coaxially fixed to the drum and the other gear wheel journaled for rotation independently of the drum about an axis coincidinig with the rotary axis of the drum and with each of said last-named two gear wheels meshing a related one of the first-named two gear wheels, a drive pinion meshing the gear wheel of said first-named two gear wheels which is in mesh with the independently journaled one of said last-named two gear wheels, a respective normally disengaged clutch for coupling each of the three independently journaled gear wheels to the drum with which it is related, independent manually controlled means for engaging the clutches, a power plant, and a reversible transmission having its input end driven from the power plant and its output end driving the drive pinion.

7. The yarder of claim 6 in which the transmission is multi-speed with corresponding r.p.m. for both ahead and astern.

8. The yarder of claim 6 employing pneumatic power for the engagement of the clutches.

9. The yarder of claim 6 having independently operated means for braking the drums selectively.

10. Structure according to claim 9 having a foundation for the yarder comprising side beams connected by cross-ties, said power plant, the transmission, and said drums, gears, and brakes being located between said side beams, the manually controlled clutch-engaging means including pneumatic piston-and-cylinder assemblies located to the outside of the foundation.

11. A yarder for use with a tail block for spooling the two ends of a cable strung through said block, comprising: two spooling drums, one for each of said cable ends, mounted side-by-side, a respective set of intermeshing gears at each of the two ends of the drums including, in each set, two gear wheels each of which is related to and lies co-axial with a respective one of the two drums, one of the gear wheels being connected to its related drum so as to rotate at all times in unison therewith, the other three of said gear wheels being journaled for rotation independently of the related drum, a respective manually controlled clutch for each of said other three gear wheels operating, when engaged, to connect the concerned gear wheel to its related drum, and a source of power drivingly connected with one of said sets of gears, the gears in said two sets of gears providing different ratios which, in the instance of one set, favors the gear wheel which is related to one drum and, in the instance of the other set, favors the gear wheel which is related to the other drum.

12. The yarder of claim 11 in which the power is passed from the power source through a reversible multi-speed transmission.

References Cited by the Examiner

UNITED STATES PATENTS

| | | | |
|---|---|---|---|
| 1,832,630 | 11/1931 | Hansen | 254—184 |
| 1,850,440 | 3/1932 | Berger | 254—184 |
| 1,884,821 | 10/1932 | Asgood | 254—184 |
| 2,773,573 | 12/1956 | Erdahl | 254—184 |

ANDRES H. NIELSEN, *Primary Examiner.*